Sept. 20, 1955
D. FIRTH
2,718,155
ADJUSTABLE SHEAVES
Filed March 20, 1952
4 Sheets-Sheet 1
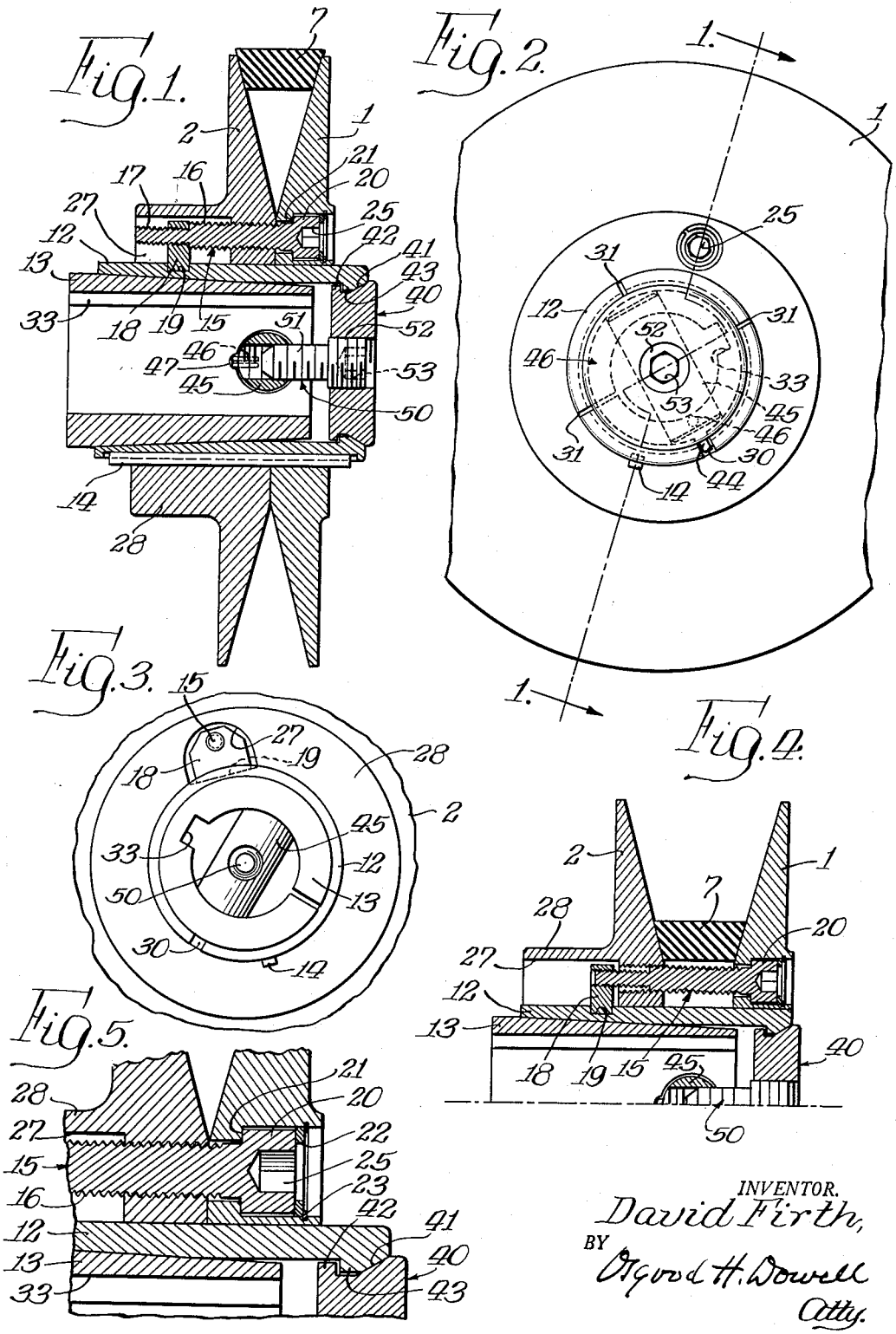
INVENTOR.
David Firth,
BY
Osgood H. Dowell
Atty.

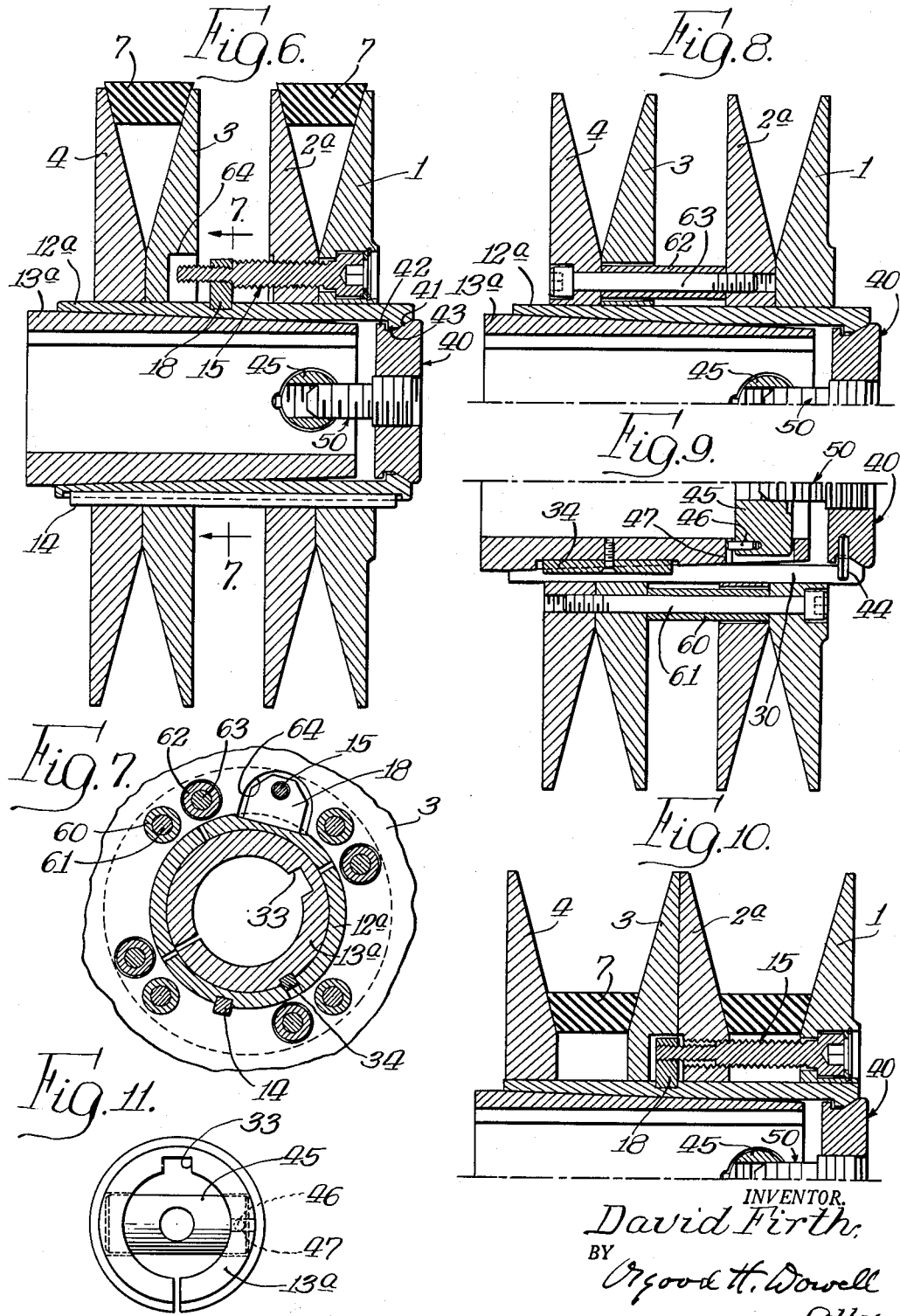

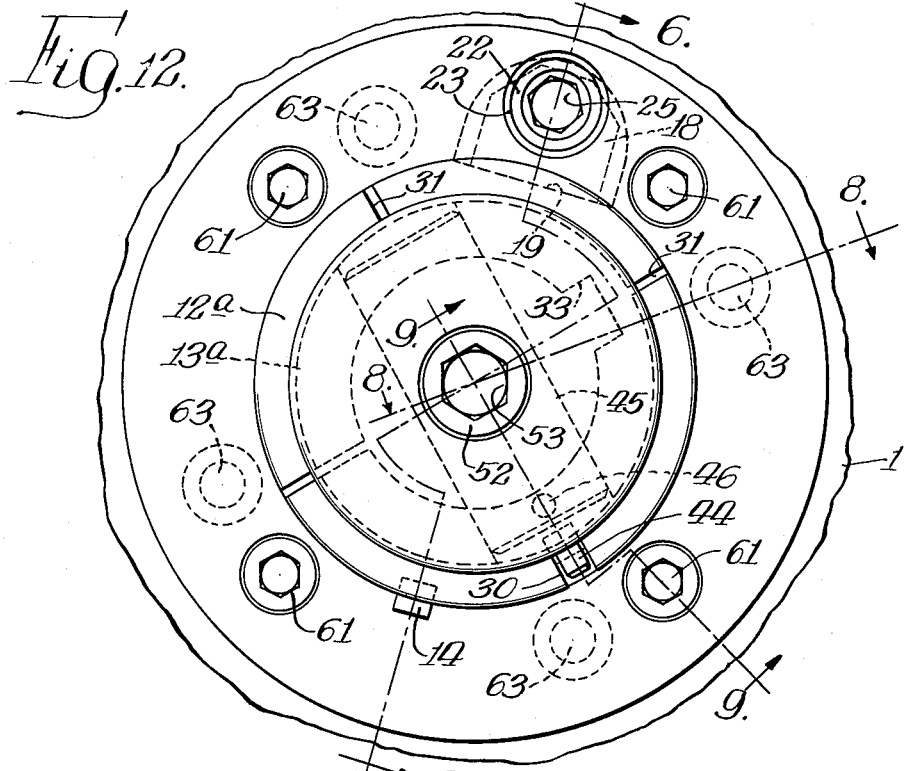
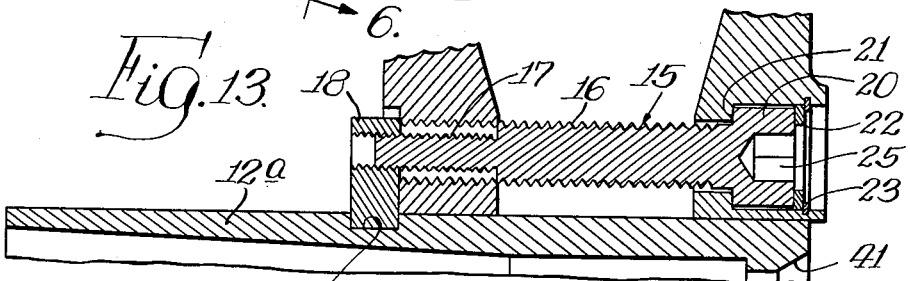
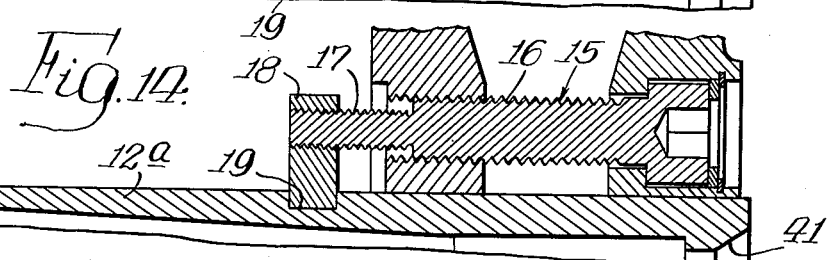
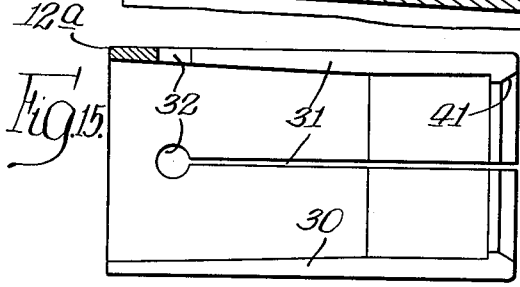
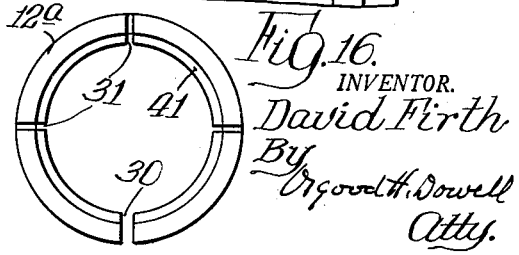

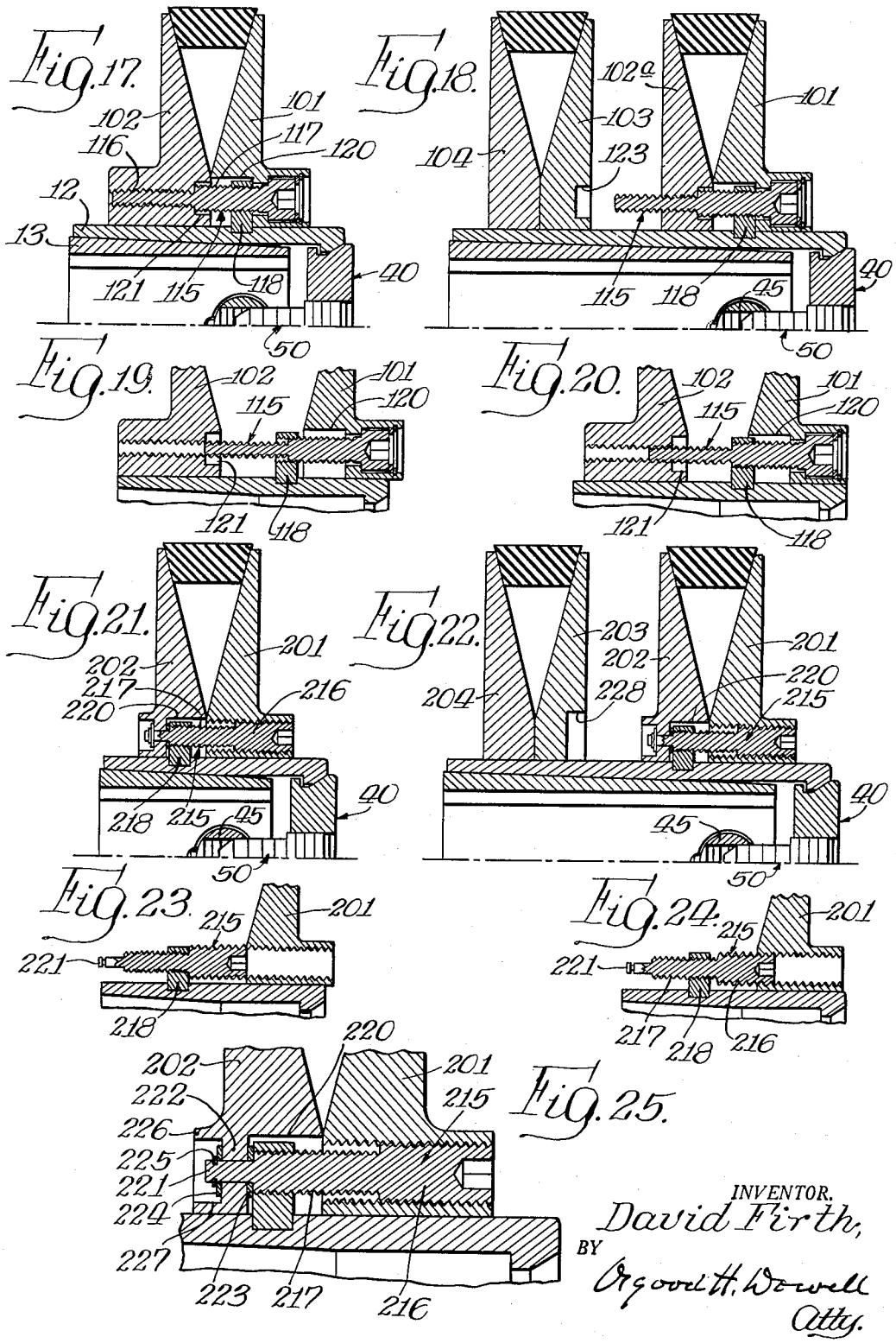

United States Patent Office 2,718,155
Patented Sept. 20, 1955

2,718,155

ADJUSTABLE SHEAVES

David Firth, South Bend, Ind., assignor to Dodge Manufacturing Corporation, Mishawaka, Ind., a corporation of Indiana Application March 20, 1952, Serial No. 277,639

13 Claims. (Cl. 74—230.17)

This invention relates to variable pitch V-belt sheaves, being applicable to both single groove and multi-grooved sheaves. The invention provides novel means for adjusting such sheaves by shifting simultaneously in opposite directions the confronting discs or sections of a single groove sheave or the interarranged groups of connected discs which form the belt grooves of a multi-grooved sheave. The invention further provides novel means for locking the sheave discs in adjusted position, and novel means for mounting the sheave on a shaft.

The term "multi-grooved" is used herein with reference to a sheave for use with a plurality of V-belts, and the term "group" is used with reference to a plurality of discs facing in the same direction and rigidly connected in spaced relation for cooperation with a plurality of opposing discs.

The adjusting means of this invention comprises an adjusting screw arranged beside and parallel with the sheave hub and directly connecting two adjacent discs, e. g. the confronting discs of a single groove sheave or adjacent discs of a multigrooved sheave, the screw being threaded in one of said discs and swiveled to the other. The screw has a coarse-threaded portion screwed into said one of the discs and a fine-threaded extension engaged by a non-rotatable nut in fixed position on the hub. The coarse and fine threads of the screw progress in the same direction, the screw being either right handed or left handed with respect to both threads. On rotation of the screw, the disc in which it is threaded moves in a direction opposite to that which the screw moves axially, while the disc to which the screw is swiveled moves with the screw. In a multi-grooved sheave, the interarranged groups of connected discs include those directly connected by the screw and are accordingly shifted by the shifting of the latter. Thus the oppositely facing discs of the sheave, whether it be single grooved or multi-grooved, are shiftable in opposite directions by the screw.

The coarse thread of the adjusting screw is preferably of a pitch twice that of the fine thread, wherefore rotation of the screw will effect shifting of the oppositely facing discs equal distances in opposite directions, the total relative movement of the oppositely shifted discs being twice as great as the axial movement of the screw. This allows adjustment for varying the effective diameter of the sheave without shifting centers of belt grooves relative to the hub, and obtains a relatively large range of adjustment for a comparatively short travel of the screw. Besides giving these desirable results, which are also obtained by the adjusting means disclosed in patent to Firth et al., No. 2,400,294 of May 14, 1946, the adjusting means of the present invention is of further advantage for simplicity, compactness, economical manufacture on a mass production basis, and susceptibility of embodiment in a multi-grooved sheave without objectionable projection of adjusting means beyond either end disc of the sheave.

Said adjusting means is of further advantage in connection with and to permit utilization of other principal features of the invention, namely the mounting of the sheave discs on a longitudinally split hub expansible to grip the discs in the bores thereof, for locking them in adjusted position in a most advantageous manner, and for fastening the hub on a shaft by a tapered bushing wedgeable and dewedgeable by means within the hub.

The invention has in view the provision of a sheave practicable for use under conditions requiring very exact adjusting, as for example in V-belt drives for the spinning frames of certain machines used in the textile industry, which frames, on account of the size and texture of the yarn to be spun, must be driven at precisely adjusted speeds. It is found that sheave discs loose on the hub tend to wear grooves in the hub, which may interfere with or render it exceedingly difficult to do precision adjusting. If the discs are adjusted to positions only minutely offset from such grooves, they are liable to get back into the grooves in operative use of the sheave, resulting in improper adjustment. It is therefore highly desirable to lock the discs to the hub by expansion of the hub to grip the discs, especially in sheaves for use under conditions such as above indicated, and otherwise to prevent rattling.

A number of specifically different embodiments of the invention in single groove sheaves, and corresponding embodiments thereof in sheaves for use with a plurality of V-belts, are shown in the accompanying drawings.

Fig. 1 is a longitudinal section of a single groove sheave, shown fully contracted for driving at maximum effective diameter, the section being taken on the staggered line 1—1 of Fig. 2.

Fig. 2 is a front end elevation of Fig. 1.

Fig. 3 is a rear end elevation of the central portion of Fig. 1.

Fig. 4 is a longitudinal half section corresponding to Fig. 1 but showing the sheave expanded for driving at minimum effective diameter.

Fig. 5 is an enlarged fragment of Fig. 1, showing the swivel connection between the adjusting screw and disc to which it is swiveled.

Fig. 6 is a longitudinal section of a two-belt sheave containing an embodiment of the invention corresponding to that of the preceding figures, showing the sheave contracted. The section is taken on the staggered line 6—6 of Fig. 12.

Fig. 7 is a cross section taken on the line 7—7 of Fig. 6 looking in the direction of the arrows.

Fig. 8 is a longitudinal half section taken on the line 8—8 of Fig. 12.

Fig. 9 is a longitudinal half section taken on the line 9—9 of Fig. 12.

Fig. 10 is a longitudinal half section corresponding to Fig 6 but showing the sheave expanded.

Fig. 11 is a front end view of a tapered hub bushing and nut mounted therein.

Fig. 12 is an enlarged front end view of the central portion of the two-belt sheave of Fig. 6, the belt-engaging portions of the sheave discs being broken away.

Figs. 13 and 14 illustrate steps in assembling with the sheave hub the discs and adjusting means shown in Fig. 6.

Fig. 15 is a longitudinal section of the taper-bored sheave hub employed in the sheave of Fig. 6.

Fig. 16 is a front end view of said hub.

Fig. 17 is a longitudinal half section of a single groove sheave embodying the invention with respect to the adjusting means in a specifically different form from that of the preceding figures.

Fig. 18 is a longitudinal half section of a two-belt sheave having adjusting means corresponding to that of Fig. 17.

Figs. 19 and 20 illustrate steps in assembling with the hub the discs and adjusting means shown in Fig. 17.

Fig. 21 is a longitudinal half section of a single groove sheave having adjusting means of still another specific form.

Fig. 22 is a longitudinal half section of a two-belt sheave having adjusting means corresponding to that of Fig. 21.

Figs. 23 and 24 illustrate steps in assembling with the hub the discs and adjusting means of Fig. 21.

Fig. 25 is an enlarged fragment of Fig. 21.

Referring first to Figs. 1 to 5, the numerals 1 and 2 designate confronting conically-faced discs for engaging an interposed V-belt 7. The discs are carried by a taper-bored hub 12 attachable to a shaft by a tapered longitudinally split contractible bushing 13, the hub being longitudinally split and expansible to grip the discs in the bores thereof for locking them fast to the hub. The discs fit slidably on the hub in its unexpanded state. Driving connection between the discs and hub is provided by a key 14 fitting in a longitudinal groove in the hub and slidably fitting in grooves therefor in the discs. The hub and bushing are connected by screw means hereinafter described, by operation of which the bushing can be wedged between the hub and a shaft, thereby expanding the hub to grip the discs and contracting the bushing to grip the shaft. By a reverse operation of said means the bushing can be dewedged or loosened, whereupon the hub by virtue of its resiliency will resume its natural unexpanded state, freeing the discs for sliding movement on the hub.

The discs 1 and 2 are connected by an adjusting screw 15 threaded in the disc 2 and swiveled to the disc 1, said screw having a coarse threaded portion 16 screwed through a threaded hole therefor in 2 and having a rearwardly extending fine threaded portion 17 engaged by a nut 18 in fixed position on the hub 12. As shown the nut 18 is fitted in a transverse hub slot 19 and held in place therein by the adjusting screw. The coarse threaded and fine threaded portions of said screw are shown as of different diameters, which avoid engagement of both threads with the disc 2. Preferably the fine threaded portion of the screw is of smaller diameter than the coarse threaded portion, permitting use of a smaller nut 18 than would otherwise be necessary.

Means for swiveling the adjusting screw 15 to the disc 1 is shown on an enlarged scale in Fig. 5. As shown, the cylindrical head 20 of said screw is rotatably fitted in a recess therefor in said disc, which recess is open at its front end and extends part way through the disc to a portion thereof providing the shoulder 21. The last mentioned portion of the disc is centraly apertured for passage of the screw shank loosely therethrough. The screw head 20 is held in abutting relation to the shoulder 21 by a washer 22 held in abutting relation to the front end of said screw head by an expansive snap ring 23 sprung into engagement with an annular groove in the cylindrical wall of said recess.

The adjusting screw 15 is provided in its fore end with a wrench socket 25 engageable by a wrench for turning the screw. On turning the screw it moves axially in the nut 18. The disc 1 moves axially with the screw. Due to the difference in pitch between the coarse and fine threads of the screw, rotation of the screw will cause the disc 2 to move relative to the hub in a direction opposite to that in which the screw moves axially. Assuming the coarse thread to be of a pitch twice that of the fine thread, the screw when turned will move the discs equal distances in opposite directions, the total relative movement thereof being twice as great as the axial movement of the screw.

The sheave is designed to permit shifting the discs toward and away from each other between the positions shown in Figs. 1 and 4. Assume for example that the differential adjusting screw 15 is right handed. Looking at Fig. 4, a turn of the screw in a clockwise direction as viewed in Fig. 2 will cause said discs to move toward each other. By continued rotation of the screw in said direction, the discs can be moved to the position shown in Fig. 1. By a reverse operation of the adjusting screw, they can be moved back to the Fig. 4 position.

The disc 2 is preferably formed to house the nut 18 and so much of the adjusting screw 15 as extends rearwardly from the screw-hole therefor in said disc. As shown, said nut and portion of the screw are contained in a recess 27 extending from said screw-hole through an extension 28 of the central portion of said disc.

The means now to be described for mounting the sheave on a shaft, with accompanying expansion of the sheave hub, are the same as for the two-belt sheave of Figs. 6 to 16, save that the hub and bushing of the latter, designated respectively as 12$^a$ and 13$^a$, are somewhat longer than those for the single groove sheave. Certain details common to the two sheaves are shown in Fig. 9.

The sheave hub 12 (similar to though shorter than that designated as 12$^a$ in Figs. 15 and 16) is split for its full length by the slot 30, and is further split from its fore end for the major portion of its length by the slits 31, which as shown in Figs. 15 and 16 extend to holes 32 in the hub. The hub construction shown permits outward flexing of the fore ends of the portions of the hub between the several splits thereof. The hub bore in this instance is tapered inwardly from its rear end to a portion of the bore of uniform diameter. The bushing 13 fits the tapered portion of the hub bore. The bushing may be keyed to the shaft on which it is to be fitted by a key engaging in the keyway 33 of the bushing. Except for use of the sheave under heavy or sudden shock load conditions, it would not be necessary to key the bushing to the hub; however the bushing may be keyed to the hub in any suitable manner, as for instance by a key such as 34 (Fig. 9) fitted in a longitudinal groove in the bushing and engaging in the slot 30 of the hub, said key being of appropriate width to allow the hub to assume its natural unexpanded state without interference.

Fitted in and attached to the fore end of the hub 12 is an annular plate 40. Said plate and hub have abutting beveled surfaces 41, and the plate has a shoulder 42 engaging behind the internal shoulder 43 in the hub. Said plate 40 can be assembled with the hub, before mounting the sheave discs on the hub, by forcing said plate into place, as is allowable by the expansibility of the hub and flexibility of the portions thereof between the several splits thereof. Said plate 40 is held from rotation in the hub by a radially disposed pin 44 fixed to and projecting from said plate into the hub slot 30, as best shown in Fig. 9.

Mounted in the bushing 13 is a cross member 45 having its end portions fitted loosely in diametrically opposite holes therefor in the bushing, said member being insertible into place through one of said holes. Said member and holes are preferably round for easy manufacture. Said cross member 45 is held from turning in the bushing by a longitudinally disposed pin 46 fixed to and projecting from one of the end portions of said member into an open-ended notch or slot 47 in the bushing, as best shown in Fig. 9.

The plate 40 and member 45 are connected by a central screw 50 by operation of which the hub and bushing can be relatively moved axially for wedging and dewedging the bushing. The screw shown is a differential screw having a threaded shank 51 and a threaded head 52 engaging in threaded screw-holes therefor extending through said member and plate, both of which function as nuts. The plate 40 may be referred to as a ring nut. The cross member 45 may be referred to as the bushing nut.

The threads on the shank and head of the wedging screw 50 progress in the same direction but are of substantially different pitch, one being a fine thread and the other a coarse thread. The fine thread is preferably on the screw-head 52, permitting use of a ring nut 40 of less thickness than would be required if the coarse thread were on the head. The screw head is formed with a wrench socket 53 for engagement by a wrench for turning the screw. Due to the difference in pitch between the fine and coarse threads of the screw 50, rotation of said screw will effect a relative axial movement between the hub 12 and bushing 13 in a direction opposite to that which the screw moves axially. By making the coarse thread of a pitch more than twice as great as that of the fine thread, the relative axial movement of the hub and bushing effected by turning the screw 50 will be greater than the axial movement of said screw.

In Fig. 1, the bushing 13 fits closely in the hub 12 but not so tightly as to contract the bushing or to expand the hub. The bushing may be slip-fitted on the stub extension of a shaft (not shown). By screwing up the screw 50 the bushing is drawn tight into the hub, thereby frictionally clutching the hub to the shaft by coaction of the tapered surfaces of the hub and bushing, with resultant contraction of the bushing to grip the shaft and expansion of the hub to grip the sheave discs mounted thereon. In this operation the fore end of the hub is expanded by coaction of the beveled surfaces 41 of the hub and ring nut 40. Thus the hub is expanded both by the bushing and by said ring nut, and hence is expanded for its full length. Moreover the hub split as described, e. g. as shown in Figs. 15 and 16, is weaker than the bushing in its uncontracted state, in the sense that the resistance of the hub to expansion is much less than the resistance of the bushing to contraction. Hence as the bushing is wedged or drawn tight into the hub by operation of the screw 50, the hub will expand and grip the sheave discs before the bushing contracts. This gives assurance of effective locking of the sheave discs on the hub, as is very desirable for reasons hereinbefore stated.

By a reverse operation of the wedging screw 50, the bushing can be dewedged or loosened sufficiently to enable the hub to resume its unexpanded state, thus freeing the sheave discs for sliding movement on the hub and allowing adjustment of their positions to be made by operating the adjusting screw 15.

A sheave of the multi-grooved type embodying the construction hereinbefore described (except for omission of the central extension 28 of the disc 2) is exemplified by the two-belt sheave shown in Figs. 6 to 16.

Said two-belt sheave comprises the series of conically faced discs 1, 2$^a$, 3 and 4 arranged with alternate discs confronting the others and cooperating therewith to form grooves for a plurality of V-belts 7. The foremost disc 1 of the series is identical to the correspondingly numbered disc of the single groove sheave hereinbefore described. The second disc 2$^a$ is the same as 2 without its central extension 28. The series comprises two interarranged and oppositely axially shiftable groups of discs, namely the group or plurality of rearwardly facing discs 1 and 3 and the group or plurality of forwardly facing discs 2$^a$ and 4. The discs of each of said groups are rigidly connected in appropriately spaced relation to allow shifting said groups simultaneously in opposite directions between the positions shown in Figs. 6 and 10. As shown, the discs 1 and 3 and interposed tubular spacers 60 slidable in 2$^a$ are connected by tie bolts 61 as in Fig. 9, and the discs 2$^a$ and 4 and interposed tubular spacers 62 slidable in 3 are connected by tie bolts 63 as in Fig. 8. Thus the sheave comprises a plurality of pairs of confronting discs, corresponding discs of said pairs being connected for movement in unison, those facing forwardly and those facing rearwardly being shiftable in opposite directions by the adjusting screw 15 which in this instance connects the discs 1 and 2$^a$ of the foremost pair.

The adjusting means of said two-belt sheave, the hub and bushing thereof, and the mechanism connecting said hub and bushing, are all identical to those of the single groove sheave first described, save that the hub 12$^a$ and bushing 13$^a$ of the two-belt sheave are somewhat longer than those of said single groove sheave. Identical parts and details of the two sheaves are designated in the drawings by the same reference numerals, wherefore the description heretofore given of the single groove sheave of Figs. 1 to 5 applies to the two-belt sheave of Figs. 6 to 16.

It will be understood that the several sheave discs of said two-belt sheave fit slidably on the hub 12$^a$ in its unexpanded state; that by operating the wedging screw 50 in Fig. 6 the bushing 13$^a$ can be wedged between the hub and the shaft on which the bushing is to be fitted, with resultant expansion of the said hub to grip the discs, such expansion being effected by coaction of the tapered surfaces of said hub and bushing and by coaction of the tapered surfaces 41 of said hub and ring nut 40; and that by a reverse operation of the wedging screw the bushing can be dewedged or loosened to enable the hub to resume its unexpanded state, releasing the discs for sliding movement on the hub, whereupon the relative positions of the two interarranged groups of discs can be adjusted by turning the adjusting screw 15 of said two-belt sheave.

Since the adjusting screw of the illustrated two-belt sheave is coarse threaded in the disc 2$^a$ and fine threaded in the nut 18, the screw being swiveled to the disc 1, a turn of the screw will cause said discs to move equal distances in opposite directions, and the other discs 3 and 4, being respectively connected with 1 and 2$^a$, will move respectively with 1 and 2$^a$. Looking at Fig. 10, and assuming the screw 15 to be right handed, a turn of the screw in a clockwise direction as viewed in Fig. 12 will cause the group or plurality of connected discs 1 and 3 to move rearwardly or toward the left in the drawings, and the group or plurality of connected discs 2$^a$ and 4 to move forwardly or to the right, so that confronting discs will mve toward each other to vary the effective diameter of the sheave. By continued rotation of the adjusting screw in said direction, the two groups of discs can be shifted to the position shown in Fig. 6. By reverse operation of said screw, said groups can be returned to the Fig. 10 position.

In the specific two-belt sheave shown in Figs. 6 to 16, the nut 18 engaging the fine threaded smaller diameter portion of the adjusting screw is located behind the disc 2$^a$, wherefore the disc 3 is formed with a recess 64 to contain said nut when the sheave discs are in the extreme position shown in Fig. 10.

In assembling either the single groove sheave of Figs. 1 to 5 or the two-belt sheave of Figs. 6 to 16, the ring nut 40 is first forced into place in the fore end of the expansible hub. The sheave discs and adjusting means therefor are then assembled on the hub in a manner which will be understood by reference to Figs. 13 and 14. First, the nut 18 is positioned on the hub in the slot 19 therefor. Next, the disc into which the adjusting screw is to be screwed, e. g. the disc 2$^a$ of the two-belt sheave, is slipped on the hub to a position abutting said nut, as shown in Fig. 13. The disc 1 having the adjusting screw 15 swiveled thereto is then placed on the hub in position for entry of the small end of said screw into the nut 18, and the screw is turned to engage its small diameter end in said nut, as shown in Fig. 13. Rotation of the screw is continued until the coarse threaded larger diameter portion of said screw enters and engages in the disc 2$^a$ and moves it a substantial distance away from said nut, preferably to the position shown in Fig. 14. The remaining discs, spacers and tie bolts of the two-belt sheave may then be assembled with the discs 1 and 2$^a$ in an obvious manner.

As before indicated, the ring nut 40 is forced into place in the fore end of the hub before the sheave discs are mounted on the hub, and said ring nut is secured from rotation relative to the hub by the pin 44 (Fig. 6). The bushing and elements connecting it to said ring nut may be assembled in the hub either before or after but preferably after the discs are mounted on the hub. This assembling is done in the following manner. After said ring nut 40 is secured in place, the wedging screw 50 is screwed into said ring nut to a predetermined position which in the illustrative structures is such that the outer face of the fine threaded screw head 52 is about flush with the outer face of said ring nut. The tapered bushing having the bushing nut 45 mounted therein is then inserted into the hub and pushed forward until said bushing nut 45 abuts the screw shank 51, with the tapered or rounded inner end of the screw within the bushing nut. In this position the bushing is loose in the hub and not so far forward as in Fig. 1 or Fig. 6. The screw is now rotated in a direction to screw into the bushing nut. As so rotated, it moves axially rearwardly to about the position shown in Fig. 1 or Fig. 6, and in this movement draws the bushing to about the position shown in Fig. 1 or Fig. 6. In this position the bushing contacts with the sheave hub. After the bushing is slipped on a shaft, the screw 50 may be operated to effect alternate wedging and dewedging of the bushing as previously described.

The present invention with respect to the adjusting means may be embodied in various specifically different constructions some of which are illustrated in Figs. 17, 18, 21 and 22. Figs. 17 and 18 are longitudinal half sections of single groove sheaves similar to that first described except as to the specific adjusting means. Figs. 21 and 22 are corresponding half sections of two-belt sheaves having adjusting means in accordance with the species thereof respectively shown in Figs. 17 and 18, said two-belt sheaves being otherwise similar to that of Figs. 6 to 16.

In Fig. 17 the sheave discs 101 and 102 are connected by an adjusting screw 115 whose fine thread is on the larger diameter portion 117 thereof and whose coarse thread is on the rearwardly extending smaller diameter portion 116 thereof, said coarse threaded smaller diameter portion 116 being screwed into a threaded hole therefor extending through the disc 102. Said adjusting screw 115 is swiveled to the disc 101 in the same manner that 15 is swiveled to 1 in Figs. 1 and 5. The fine threaded larger diameter portion 117 of said screw 115 is engaged by the nut 118 in fixed position on the sheave hub, said nut in this instance being located in front of the disc 102, and the disc 101 being formed with a recess 120 to receive said nut as the discs move to the position shown in Fig. 17. The disc 102 has also a recess 121 to receive the rear end portion of 117 when the discs are in said position. By means of the adjusting screw the sheave can be expanded and contracted by shifting the discs simultaneously equal distances in opposite directions between the position shown in Fig. 17 and a position corresponding to that of Fig. 4.

To assemble the screw 115, nut 118 and discs 101 and 102 on the sheave hub, the nut 118 is placed in position on the hub in the slot therefor and the disc 101 having the screw swiveled thereto is then slipped on the hub to a position for engaging the fine threaded larger diameter portion 117 of the screw in the nut. The screw is turned until said portion 117 thereof enters and engages in the nut for about from one third to one half of the thickness of the nut, as shown in Fig. 19. The disc 102 is then slipped on the hub to a position butting the small end of the screw, as in Fig. 19. The screw is then turned to engage its coarse threaded smaller diameter portion 116 in the disc 102, thereby moving said disc toward the disc 101, as in Fig. 20. By continuing to turn the screw, the parts can be brought to the relationship shown in Fig. 17.

Fig. 18 represents a two-belt sheave comprising discs 101, 102ª, 103 and 104, having in association with 101 and 102ª adjusting means identical with that of Fig. 17, identical parts of the two sheaves being designated by the same reference numerals in Figs. 17 and 18. The disc 102ª is identical to 102 except for omission of the central extension of 102. The disc 103 has a recess 123 to accommodate the rear end portion of the adjusting screw when the sheave is expanded.

In the single groove sheave of Fig. 21, portions of which are shown on an enlarged scale in Fig. 25, the sheave discs 201 and 202 are connected by an adjusting screw 215 having its coarse threaded larger diameter portion 216 screwed into a threaded hole therefor extending through 201, and having its rearwardly extending fine threaded smaller diameter portion 217 engaged by the nut 218 in fixed position on the hub. The screw is swiveled to the disc 202, its connection therewith, best shown in Fig. 25, being behind said nut. Said disc 202 has a recess 220 to accommodate said nut as the discs move toward and to the position shown. The screw is formed with a rear terminal stud 221 extending through and rotatably fitted in the web portion 222 of the disc 202. At opposite sides of 222 are washers 223 and 224. The washer 223 is fitted between 222 and the rear end of 217. The other washer 224 is held against 222 by a contractile snap ring 225 engaging in an annular groove therefor in the stud 221. Thus the adjusting screw 215 connects the sheave discs by threaded engagement with the disc 201 and a swivel connection with the disc 202. By operating the screw, the sheave can be expanded and contracted in the same manner as the others.

The discs 201 and 202, with the adjusting nut 215 and nut 218, can be assembled on the sheave hub in the following manner. While holding said nut in place on the hub, the screw 215 is screwed into said nut until the shoulder formed by the rear end of the larger diameter portion 216 of said screw is flush with said nut, as shown in Fig. 23. The disc 201 is then slipped on the hub to a position against the fore end of the screw, as shown in said figure. The screw is now turned in a reverse direction, causing its coarse threaded larger diameter portion to enter and engage in the screw-hole therefor in the disc 201, as shown in Fig. 24. Rotation of the screw in the last mentioned direction is continued until the screw is in the relation to 201 and 218 shown in Figs. 21 and 25. The washer 223 is then placed on the stud 221 against the shoulder formed by the rear end of 217. The disc 202 is now slipped on the hub to the position shown, and is secured in swiveled connection with the stud 221 by applying the washer 224 and snap ring 225.

Fig. 22 represents a two-belt sheave comprising discs 201, 202, 203 and 204, having adjusting means identical to that of Fig. 21. Identical parts of the two sheaves are designated by the same reference numerals in Figs. 21 and 22. In both figures, the disc 203 is shown formed with a short central extension 226 having a recess 227 in which the projecting end of the stud 221, the washer 224 and snap ring 225 are housed, as best shown in Fig. 25. In Fig. 22 the disc 203 has a recess 228 to accommodate the central extension of 202 when the sheave is fully expanded.

The sheaves herein described and those disclosed in my copending application for Adjustable Sheaves, Ser. No. 277,638, filed March 20, 1952 concurrently herewith now Patent No. 2,697,947, exemplify different species of a common generic invention with respect to the adjusting means. In the species herein disclosed, the adjusting screw directly connects adjacent oppositely shiftable discs, being threaded in one and swiveled to the other; whereas in the species illustrated in said copending application the adjusting screw is threaded in a disc of one shiftable group and swiveled to the other group by butting of the screw ends against the discs adjacent to opposite sides of the one in which the screw is threaded.

Although the locking of the sheave discs to the hub by expansion of the latter is a highly desirable feature, the invention with respect to the adjusting means is not limited to that feature, since the adjusting means may be employed in a sheave in which the discs are slidably fitted on a solid or unsplit and inexpansible hub, as for example in the previously mentioned patent to Firth et al. or as described in said copending application. In case of employing a solid hub, it is desirable to provide for locking the sheave in adjusted condition, either by fastening one of the discs to the hub by set screws or by locking the adjusting screw. Means for these functions disclosed in said copending application may be applied to sheaves having adjusting means in accordance with the present invention.

I claim:

1. An adjustable sheave comprising a pair of confronting annular discs cooperating to form a belt groove, a hub on which said discs are slidably fitted in driving connection therewith, an adjusting screw parallel with the hub directly connecting said discs, said screw being threaded in one of said discs and directly swivel-coupled to the other disc for moving the latter axially with the screw in either direction, said screw connecting said discs solely by its threaded engagement with said one and its direct swivel coupling to the other, said screw having coarse and fine threaded portions the threads of which progress in the same direction, the pitch of the coarse thread being twice that of the fine thread, said coarse threaded portion being screwed into said one of the discs, and a non-rotatable nut fixed on the hub engaging said fine threaded portion, whereby said discs can be shifted simultaneously equal distances in opposite directions by said screw.

2. An adjustable sheave according to claim 1 having said hub formed with means engageable by said nut to hold the nut from turning and from moving axially, the nut being held in engagement with said means by said screw.

3. An adjustable sheave according to claim 1 having said one of the discs arranged between the nut and the other disc, the fine threaded portion of the screw being of sufficiently smaller diameter than that of said coarse threaded portion to prevent engagement of said fine threaded portion by said one of the discs.

4. An adjustable sheave according to claim 1 wherein said coarse and fine threaded portions of the screw are of sufficiently different diameters to permit passing the smaller diameter portion through the screw hole for the larger diameter portion in assembling said screw and nut with said discs on the hub.

5. An adjustable sheave according to claim 1 wherein the coarse threaded portion of the screw is between the swiveled end of the screw and the fine threaded portion thereof, the disc in which the screw is threaded being between said nut and the other disc.

6. An adjustable sheave according to claim 1 wherein the fine threaded portion of the screw is between the coarse threaded portion therein and the swiveled end of the screw, the nut being between said discs, and the disc to which the screw is swiveled having a recess to accommodate said nut.

7. An adjustable sheave comprising two interarranged and oppositely axially shiftable groups of annular discs cooperating to form belt grooves, the discs of each group being rigidly connected in spaced relation and arranged in alternation with and confronting those of the other group, a hub on which the discs are slidably fitted in driving connection therewith, an adjusting screw parallel with the hub directly connecting two adjacent discs, said screw being threaded in one of said adjacent discs and directly swivel-coupled to the other for moving the latter axially with the screw in either direction, said screw connecting said adjacent discs solely by its threaded engagement with said one and its direct swivel coupling to the other, said screw having coarse and fine threaded portions the threads of which progress in the same direction, the pitch of the coarse thread being twice that of the fine thread, said coarse threaded portion being screwed into said one of the discs, and a non-rotatable nut fixed on the hub engaging said fine threaded portion of the screw, whereby said groups of discs can be shifted simultaneously equal distances in opposite directions by said screw.

8. An adjustable sheave comprising a plurality of pairs of confronting annular discs for engaging a plurality of V-belts, corresponding discs of said pairs being rigidly connected in spaced relation to allow relative shifting as units of the group of discs facing forwardly and the group of discs facing rearwardly, a hub on which said discs are slidably fitted in driving connection therewith, an adjusting screw parallel with said hub directly connecting the discs of the foremost pair, said screw being threaded in one disc of said pair and directly swivel-coupled to the other disc of said pair for moving it axially with the screw in either direction, said screw connecting said discs of said pair solely by its threaded engagement with said one and its direct swivel coupling to said other disc of said pair, said screw having coarse and fine threaded portions the threads of which progress in the same direction, the pitch of the coarse thread being twice that of the fine thread, said coarse threaded portion being screwed into said one of the discs, and a non-rotatable nut fixed on said hub engaging the fine threaded portion of the screw, whereby said groups of discs can be shifted simultaneously equal distances in opposite directions by said screw.

9. An adjustable sheave according to claim 8 wherein said screw is swiveled to the foremost disc of said foremost pair and extends through and in threaded engagement with the other disc of said pair and has its fine threaded portion extending rearwardly from its coarse threaded portion, said nut being located behind said other disc.

10. An adjustable sheave according to claim 8 wherein said screw is swiveled to the foremost disc of the foremost pair and extends through and in threaded engagement with the other disc of said pair, the fine threaded portion of said screw being between the swiveled end and coarse threaded portion of said screw, said coarse threaded portion extending rearwardly from said fine threaded portion, said nut being between the discs of said pair, said foremost disc of said pair being recessed to accommodate said nut.

11. An adjustable sheave according to claim 8 having its coarse threaded portion threaded in the foremost disc of the foremost pair and its fine threaded portion extending rearwardly from said coarse threaded portion and swiveled to the other disc of said pair, said nut being between the discs of said pair, and said other disc of said pair being recessed to accommodate said nut.

12. An adjustable sheave comprising two interarranged and oppositely axially shiftable groups of annular discs cooperating to form belt grooves, the discs of each group being rigidly connected in spaced relation and arranged in alternation with and confronting those of the other group, a hub on which the discs are slidably fitted in driving connection therewith, an adjusting screw parallel with the hub directly connecting two adjacent discs, said screw being threaded in one of said adjacent discs and directly swivel-coupled to the other for moving the latter axially with the screw in either direction, said screw connecting said adjacent discs solely by its threaded engagement with said one and its direct swivel coupling to the other, said screw having coarse and fine threaded portions the threads of which progress in the same direction, the pitch of the coarse thread being twice that of the fine thread, said coarse threaded portion being screwed into said one of the discs, and a non-rotatable nut fixed on the hub engaging said fine threaded portion of the screw, whereby said groups of discs can be shifted simultaneously equal distances in opposite directions by said screw, the spacing of the discs of each group and the proportions and arrangement of said screw and nut being such that by rotating the screw said groups can be shifted between two extreme positions in one of which confronting discs abut and in the other of which non-confronting discs abut.

13. An adjustable sheave comprising a plurality of pairs of confronting annular discs for engaging a plurality of V-belts, corresponding discs of said pairs being rigidly connected in spaced relation to allow relative shifting as units of the group of discs facing forwardly and the group of discs facing rearwardly, a hub on which said discs are slidably fitted in driving connection therewith, an adjusting screw parallel with said hub directly connecting only the discs of the foremost pair, said screw extending through and in threaded engagement with one disc of said pair and directly swivel-coupled to the other disc of said pair for moving it axially with the screw in either direction, said screw connecting the discs of said pair solely by its threaded engagement with said one and its direct swivel coupling to the other disc of said pair, said one disc being the forwardly facing disc of said pair, said screw having coarse and fine threaded portions the threads of which progress in the same direction, the pitch of the coarse thread being twice that of the fine thread, said coarse threaded portion being screwed into said one of the discs, the fine threaded portion extending rearwardly from said coarse threaded portion, and a non-rotatable nut fixed on said hub behind said one of the discs engaging the fine threaded portion of the screw, whereby said groups of discs can be shifted simultaneously equal distances in opposite directions by said screw.

References Cited in the file of this patent

UNITED STATES PATENTS

| | | |
|---|---|---|
| 2,545,327 | Williams | Mar. 13, 1951 |
| 2,610,515 | Williams | Sept. 16, 1952 |

FOREIGN PATENTS

| | | |
|---|---|---|
| 15,266 | Great Britain | of 1911 |